3,003,951
PROCESS FOR PREPARING SILICA-ALUMINA CRACKING CATALYSTS AND A HYDROCARBON CONVERSION PROCESS USING SAID CATALYSTS

Milton E. Winyall, Baltimore, Md., assignor to W. R. Grace & Co., New York, N.Y., a corporation of Connecticut
No Drawing. Filed Apr. 16, 1959, Ser. No. 806,743
8 Claims. (Cl. 208—120)

This invention relates to silica-alumina catalysts and more particularly to a process for preparing such catalysts. In another aspect, it relates to a hydrocarbon cracking process using such catalysts.

This application is a continuation-in-part of application Serial No. 531,593, filed August 30, 1955, now Patent 2,886,512.

Silica-alumina composites are in extensive commercial use for catalytic purposes as the catalyst itself, as a component thereof, or as a carrier for a catalytic agent. These composites usually comprise silica gel as a major constituent (60%–90%) and alumina as a minor constituent (40%–10%) with a minimum of impurities. The most commonly employed process for their preparation consists of mixing a mineral acid with a sodium silicate solution to form a silica hydrogel, impregnating the hydrogel with an aluminum salt solution, adding a basic precipitant to precipitate alumina, washing the resulting silica-alumina composite to remove undesirable impurities, and drying and activating the washed composite. In this process, the silica hydrogel may be washed prior to impregnation or the washing may be deferred until after the composite has been dried. In another process, a washed silica hydrogel is saturated with an aluminum salt solution and the mixture is heated to decompose the salt and deposit alumina on the silica.

The cracking catalysts now in general use contain 11–13% alumina supported on a silica gel base. It is a general belief, however, that catalysts containing lower concentrations of alumina, of the order of 7% for example, could function satisfactorily in cracking processes, but efforts to produce such a catalyst have not proved successful. While it may be a simple matter to incorporate the requisite amount of alumina, other factors in catalyst preparation tend to influence catalyst performance in the cracking operation. The properties of silica-alumina cracking catalysts vary tremendously with only slight variations in the method of preparation. Among the principal factors which influence catalyst activity and stability are the presence of impurities, such as soda and sulfates, and a uniform distribution of alumina in and on the silica gel carrier.

A process has now been provided whereby a satisfactory silica-alumina catalyst containing about 7% alumina can be prepared. The process comprises forming a slurry of silica hydrogel containing dissolved alkali metal carbonate, aging the slurry, adding to the aged slurry an aqueous solution of an aluminum salt whereby the dissolved alkali metal carbonate present in the slurry precipitates alumina in and on the silica hydrogel, aging the resulting slurried silica-alumina composite for a prolonged period, and without filtering the slurry directly drying the aged composite. The dried product is then conventionally finished off by washing and redrying. A catalyst thus prepared contains less alumina than is generally present in catalysts now in use and has remarkable stability when employed in hydrocarbon cracking operations.

In accordance with the present invention, a silica hydrogel is prepared according to the teachings of copending application Serial No. 531,593. This involves neutralizing an aqueous alkali metal silicate solution by the addition thereto of carbon dioxide and results in the formation of a silica hydrogel containing dissolved alkali metal carbonate dispersed therethrough. While the process may be carried out with any of the alkali metal silicates and any aluminum salt, sodium silicate and aluminum sulfate will be generally employed because of their favorable economic position and the invention will be described with reference to these particular materials. While the aluminum salts of any of the strong mineral acids, such as aluminum sulfate, aluminum nitrate and aluminum chloride, for example, are preferred, it is also within the scope of the invention to employ salts of a weak acid, such as aluminum acetate, and readily hydrolyzable aluminum compounds, such as the lower alcoholates, as a source of alumina.

In preparing the silica hydrogel, the starting sodium silicate solution may be any commercially available water glass having a $SiO_2:Na_2O$ weight ratio of from about 1:1 to 3.40:1. The neutralization will usually be effected by the addition of carbon dioxide gas to the sodium silicate solution. This may be accomplished by bubbling the gas into a vessel containing the sodium silicate, or the reactants may be contacted in a mixing nozzle. Regardless of the method of mixing chosen, the reactants are desirably thoroughly agitated following contact and through formation of the silica hydrogel so that there results an aqueous slurry of hydrogel particles containing dissolved sodium carbonate.

Using a sodium silicate solution having a silica-to-soda weight ratio of about 3.25:1, the chemical reaction takes place according to the following equation:

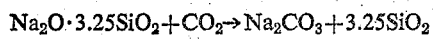

$$Na_2O \cdot 3.25SiO_2 + CO_2 \rightarrow Na_2CO_3 + 3.25SiO_2$$

It is apparent from this reaction that for each mol of $Na_2O$ present in the starting sodium silicate solution, it is possible to precipitate one-third mol of alumina from an aluminum sulfate solution. Accordingly, a satisfactory catalyst containing 5–10% by weight alumina can be prepared by introducing the requisite amount of aluminum sulfate solution into the reaction mixture. Neutralization of the silicate, however, need not be complete because the unreacted or free $Na_2O$ will assist in subsequently precipitating the alumina. Therefore, although neutralization will be generally complete, a satisfactory catalyst can be prepared wherein only 70% of the soda is converted to sodium carbonate. Regardless of whether neutralization is 70% or 100% complete, the resulting silica hydrogel will exhibit an alkaline pH, because of the presence of sodium carbonate. There is no apparent advantage in using a great excess of carbon dioxide, for example, 150–200% of that required for complete neutralization. The use of excess carbon dioxide will of course lower the pH of the resulting silica hydrogel through formation of sodium bicarbonate and adversely affect spontaneous precipitation of alumina. Upon the addition of aluminum sulfate to a silica hydrogel formed with a great excess of carbon dioxide there is formed a basic aluminum sulfate, and sulfate ions thus held are only very difficultly removed from the silica-alumina composite. Carbon dioxide is, therefore, added in amount sufficient to form the silica hydrogel and convert completely or substantially completely the $Na_2O$ concentration of the sodium silicate solution.

In the initial reaction of carbon dioxide with the sodium silicate solution, carbon dioxide is always added in amount sufficient to form the silica hydrogel. The point of gelation is dependent upon concentration of $SiO_2$ in the silicate solution, temperature and pH, for example. Under normal conditions, a silica hydrosol is first formed which, after a period of a few minutes, sets to a rather firm gel. Set time in the present invention is usually not more than about 10 minutes and generally is of the order of about ½ to 2 minutes. Agitation of the reaction mixture is continued during and subsequent setting of the hydrosol to maintain the hydrogel in slurry form. The hydrogel is aged for about 30 to 60 minutes with agitation which prevents setting to a hard mass and maintains the hydrogel in slurry form. The pH of the hydrogel after aging is about 9.5 to about 10.5.

To the aged slurry of silica hydrogel there is then added an aqueous solution of aluminum sulfate with continued agitation. The aluminum sulfate reacts with the sodium carbonate dispersed throughout the pores of the silica hydrogel and with any free $Na_2O$ present in the slurry, thus precipitating alumina. The pH of the resulting slurried silica-alumina composite after the requisite amount of aluminum sulfate has been added is about 7.0 to 8.5. As indicated above, a sodium silicate solution having a silica-to-soda weight ratio of about 3.25:1 will yield one mol of $Na_2CO_3$ which in turn will precipitate one-third mol of alumina from an aluminum sulfate solution. It is desirable that the aluminum sulfate solution be free of substantial quantities of free acid. The presence of such acid tends to neutralize sodium carbonate thus removing portions of the alkali necessary to precipitate all of the alumina from the aluminum sulfate solution. Since such solutions are prepared by dissolving alumina hydrate in sulfuric acid, the absence of excess acid is not always assured and occasionally the solution will contain about 1 to 2% free sulfuric acid. Under these circumstances, small amounts of free acid will not seriously affect the final product, the only disadvantage being that the theoretical quantity of alumina precipitatable by the sodium carbonate originally present will not be attained.

The silica-alumina composite thus formed is aged for a prolonged period, of the order of about 24 to 72 hours and preferably about 48 hours. It was discovered that changes in the density of the silica-alumina composite did not cease upon addition of all of the aluminum sulfate solution to the hydrogel and that such continuation of density change coupled with the fact of low concentration of $Al_2O_3$ (7%) prevented satisfactory filtration of the silica-alumina slurry. With the low alumina content in the composite, the corollary increased $SiO_2$ concentration causes the gelatinous particles to blind the filter cloth. Accordingly, with a prolonged aging period density change decreased with time and such aging permits completion of the catalyst preparation. Attempts to filter the slurried silica-alumina composite on a string filter following aluminum sulfate addition were unsuccessful. Due to the continuing density change of the composite the slurry appeared as a thin mass, yielding a thin filter cake which could not be removed from the string filter.

The composite is not filtered and reslurried, as is customary in catalyst preparation, but it is dried immediately following termination of the aging period. Such drying is feasibly accomplished by passing the aged slurry into a spray drier and formed into microspheres. Following drying, the silica-alumina composite is washed substantially free of impurities and then redried.

As thus described, the resulting catalyst showed remarkable stability and activity in hydrocarbon cracking operations. While it is not definitely known whether such stability and activity is due to the low concentration of alumina, the aging of the silica-alumina composite, or the direct drying of the aged composite without first filtering the mass, it is reasonable to assume that a combination of these factors contributes immeasurably to its success.

The invention is further illustrated by the following example:

EXAMPLE

A 7.0° Bé. aqueous solution of sodium silicate containing 5.0% $SiO_2$ and 1.5% $Na_2O$ ($SiO_2$:$Na_2O$ weight ratio of about 3.23:1) was mixed with carbon dioxide gas in a mixing nozzle in amount sufficient to form a silica hydrosol at a pH of 10.1. The hydrosol set to a hydrogel in 74 seconds. Agitation of the hydrogel was continued to maintain the particles in slurry form and the slurry was then aged for 50 minutes. Thereafter sufficient aluminum sulfate solution containing 65 g. $Al_2O_3$ per liter, or 5% by weight $Al_2O_3$, was added to the aged slurry with continued agitation. After all aluminum sulfate solution was added, the pH of the slurry was 7.9. 300 gallons of the catalyst slurry containing the resulting silica-alumina composite were then collected and aged for 65½ hours. Following the aging period, the slurry was then passed to a spray drier, the dried microspheres were collected and washed on a crock filter and then redried in a tray drier. Analysis of the final product gave the following results:

| | Percent |
|---|---|
| Total volatile matter | 9.43 |
| $Al_2O_3$ (dry basis) | 7.11 |
| $Na_2O$ (dry basis) | 0.155 |
| $SO_4$ (dry basis) | 0.18 |
| $NH_3$ (overall basis) | 1.84 |

In order to determine the catalytic cracking activity and stability of a silica-alumina cracking catalyst, an accelerated test has been devised to simulate the conditions prevalent during the early period of catalyst use where the decrease of catalyst stability is most pronounced. This test involves compressing a sample of fresh catalyst into pellets and splitting the compressed pellets into two portions, one for thermal deactivation and one for steam deactivation. Thermal deactivation is carried out in two muffle furnaces; first at a temperature of 400° F. and then at 1550° F. The sample is moved from the low temperature to the higher temperature muffle, remaining in each for three hours. Steam deactivation is carried out first at atmospheric pressure and in the absence of steam by holding the catalyst for five hours at 400° F., and then for three hours at 1050° F., followed by treatment in an atmosphere of steam at 60 p.s.i.g. and 1050° F. for 24 hours.

The activity of the catalyst prepared according to the foregoing example was tested as described above. In carrying out the activity test, 200 ml. of deactivated catalyst were placed in a reactor and maintained at a temperature of 850° F. During a period of 2 hours, 238.2 ml. of virgin East Texas light gas oil was passed through the hot catalyst. The cracked products were recovered and separated. The fraction which distilled below 400° F., as well as gas and loss, was determined and designated as the distillate plus loss, or more simply, $D+L$. The results of this test are as follows:

Table 1

| | Thermal Activity at 1,550° F. | Steamed Activity at 1,050° F. |
|---|---|---|
| Percent $D+L$ | 44.3 | 29.2 |
| G.P.F. | 1.08 | 1.96 |
| C.P.F. | 0.93 | 1.04 |

In the above table, G.P.F. and C.P.F. refer to "gas producing factor" and "carbon producing factor," respectively. The values assigned these factors are relative to the gas and carbon produced by a standard catalyst, which is taken as 1.00 in both cases. These factors are a measure of stability. It is apparent, that the catalyst prepared according to this invention performs as well in cracking processes as the present commercially available catalysts containing higher amounts of alumina.

The catalytic activity and stability of a 7% alumina catalyst of the present invention is further illustrated by the following activity and surface measurement profiles which were taken at various elevated temperatures. It is noted that at temperatures below 1650° F., thermal activity is somewhat below the activity of 13% alumina catalysts at these temperatures, which is expected, but at 1700° F. and 1750° F., the activity of the 7% alumina catalyst is higher than the activity of silica-alumina catalysts containing 13% and most catalysts containing 25% alumina. Surface measurements show the same trend; such measurements being lower at temperatures below 1650° F. for 13% alumina catalysts but measurements are higher above this temperature:

Table II
THERMAL

| Temperature | Catalytic Activity, Percent $D+L$ | G.P.F. | C.P.F. | Surface Area, m.²/g. |
|---|---|---|---|---|
| 1,000° F | 51.4 | 1.03 | 0.87 | 406 |
| 1,250° F | 48.4 | 0.95 | 0.81 | 394 |
| 1,550° F | 44.3 | 1.08 | 0.93 | 316 |
| 1,650° F | ¹ 43.5 | 0.94 | 0.85 | 296 |
| 1,700° F | ¹ 36.9 | 0.98 | 0.99 | 203 |
| 1,750° F | ¹ 29.8 | 1.19 | 1.15 | 125 |

STEAM

| | | | | |
|---|---|---|---|---|
| 1,050° F | ¹ 27.7 | 1.00 | 1.04 | 129 |

¹ Average.

The silica-alumina material prepared according to the present invention may be spray-dried to form microspheres, or it may be dried to form granules, which may be used as such, or ground, or formed into pellets. The general method of cracking with the catalysts of this invention usually involves contacting heated hydrocarbon feedstock with the catalyst at substantially atmospheric pressure and temperatures of about 850°–950° F., and fractionating the cracked products. The conditions and the manner of carrying out the cracking process are generally well known in the art.

I claim:
1. A process for preparing silica-alumina catalysts containing about 7% alumina which comprises reacting an aqueous solution of an alkali metal silicate with carbon dioxide in amount sufficient to convert at least 70% of the free alkali to alkali carbonate and form a slurry of silica hydrogel containing dissolved alkali metal carbonate, aging the hydrogel slurry, commingling with the aged slurry an aqueous solution of an aluminum salt in amount sufficient to incorporate the requisite amount of alumina in the final catalyst whereby alumina is precipitated from said salt solution in and on said hydrogel and thereby form a slurried silica-alumina composite, aging said composite for a prolonged period, drying the aged composite and purifying the dried composite.
2. A process according to claim 1 wherein the aluminum salt is a salt of a strong mineral acid.
3. A process according to claim 2 wherein the aluminum salt is aluminum sulfate.
4. A process according to claim 1 wherein the alkali metal silicate is sodium silicate.
5. A process for preparing silica-alumina hydrocarbon cracking catalysts containing about 7% alumina which comprises reacting a sodium silicate solution with carbon dioxide in amount sufficient to substantially completely convert all of the soda to sodium carbonate and form a slurry of silica hydrogel containing dissolved sodium carbonate at a pH between about 9.5 to 10.5, aging said slurry for about 30 to 60 minutes, commingling with the aged slurry an aqueous solution of aluminum sulfate in amount sufficient to incorporate the requisite amount of alumina in the final catalyst whereby alumina is precipitated in and on said hydrogel and thereby form a slurried silica-alumina composite, aging said composite for a period of about 24 to 72 hours, directly drying said composite following termination of the aging period, and purifying the dried composite.
6. A process for preparing a silica-alumina hydrocarbon cracking catalyst which comprises reacting a sodium silicate solution with carbon dioxide in amount sufficient to substantially completely convert all of the soda to sodium carbonate and form a slurry of silica hydrogel containing dissolved sodium carbonate at a pH of about 10.0, aging said slurry for about 50 minutes, commingling with the aged slurry an aluminum sulfate solution in amount sufficient to incorporate about 7% alumina in the final catalyst whereby alumina is precipitated in and on said hydrogel and thereby forming a slurried silica-alumina composite having a pH of about 8.0, aging said composite for a period of about 48 hours, directly spray drying said composite following termination of the aging period, and washing and redrying the resulting composite.
7. A process according to claim 6 wherein the sodium silicate solution has a silica-to-soda weight ratio of about 3.25:1.
8. A process for cracking hydrocarbon oils which comprises passing the oil under cracking conditions through a cracking zone containing a silica-alumina catalyst having about 7% alumina prepared by reacting an aqueous alkali metal silicate solution with carbon dioxide to form a slurry of silica hydrogel containing dissolved alkali metal carbonate, aging said slurry for about 30 to 60 minutes, commingling with the aged slurry an aqueous solution of an aluminum salt whereby alumina is precipitated from said salt solution in and on said hydrogel and thereby form a silica-alumina composite, aging said composite for about 24 to 72 hours, directly spray drying the aged composite, and purifying the dried composite.

References Cited in the file of this patent
UNITED STATES PATENTS

| 2,174,177 | Kraybill et al. | Sept. 26, 1939 |
| 2,386,337 | Moyer | Oct. 9, 1945 |
| 2,462,798 | Wilson | Feb. 2, 1949 |
| 2,886,512 | Winyall | May 12, 1959 |